United States Patent [19]

Emberty et al.

[11] Patent Number: 5,471,445
[45] Date of Patent: Nov. 28, 1995

[54] APPARATUS AND METHOD FOR SENSING AND HOLDING AN ITEM

[75] Inventors: Robert G. Emberty; Felix J. Misewich; Edward J. Pawlowski, all of Tuscson, Ariz.

[73] Assignee: International Business Machines Corporation, Armonk, N.Y.

[21] Appl. No.: 262,718

[22] Filed: Jun. 20, 1994

[51] Int. Cl.[6] .................................................. G11B 15/68
[52] U.S. Cl. .............................. 369/34; 360/92; 414/273; 414/280; 901/40; 901/46
[58] Field of Search ........................ 360/71, 92; 414/266, 414/273, 280, 932; 901/40, 46; 369/34, 75.2, 178

[56] References Cited

U.S. PATENT DOCUMENTS

| | | | |
|---|---|---|---|
| 3,684,961 | 8/1972 | Muir | 324/207.18 |
| 3,749,993 | 7/1973 | Laman | 318/563 |
| 3,796,850 | 3/1974 | Morelan, II et al. | |
| 3,831,197 | 8/1974 | Beach et al. | 360/92 X |
| 3,834,559 | 9/1974 | Schaffer | 414/753 |
| 3,888,365 | 6/1975 | Reimann et al. | |
| 4,271,439 | 6/1981 | Siryj et al. | |
| 4,647,268 | 3/1987 | Scholl | 414/416 |
| 4,824,311 | 4/1989 | Mims | 414/273 |
| 4,846,620 | 7/1989 | Mims | 414/273 |
| 4,882,837 | 11/1989 | Higuchi | 901/46 X |
| 4,950,987 | 8/1990 | Vranish et al. | 901/46 X |
| 5,129,777 | 7/1992 | Pohjonen et al. | 414/280 |
| 5,380,139 | 1/1995 | Pohjonen et al. | 414/280 |

FOREIGN PATENT DOCUMENTS 4-21306  1/1992  Japan ........................ 901/46

OTHER PUBLICATIONS

IBM TDB, V. 27, n. 2, Jul., 1984, p. 977, "Cartridge for Automatic Retrieval", P. R. Bareman, et al.
IBM TDB, V. 27, n. 1B, Jun., 1984, p. 473ff, "Automatic Feed Cartridge Pick–Up Mechanism", P. R. Bareman, et al.
IBM 3850 Mass Storage System (MSS) Principles of Operation: Theory, GA32–0035–1, File No. S370–07, Second Edition, Nov., 1981.

*Primary Examiner*—Andrew L. Sniezek
*Assistant Examiner*—James L. Habermehl
*Attorney, Agent, or Firm*—D. A. Shifrin

[57] ABSTRACT

An automated storage and retrieval system includes an accessor device to magnetically hold a stored item while the item is transported within the system. To sense the presence of a magnetically attractable label on the item, the device generates a pulsed signal having a first strength. The reluctance of the magnetic field is compared with a base value; if the comparison indicates that a label is present, the device generates another pulsed signal having a greater strength to "lock" the item against the accessor. The device then generates another pulsed signal having a reduced strength to maintain and hold the item against the accessor during transportation. Less power is used and, therefore, less heat generated.

11 Claims, 2 Drawing Sheets

APPARATUS AND METHOD FOR SENSING AND HOLDING AN ITEM

TECHNICAL FIELD OF THE INVENTION

The present invention relates to automated storage and retrieval jukeboxes and libraries, and in particular, to sensing the presence of a magnetically attractable label on a cartridge in a library and magnetically holding such cartridge while transporting the cartridge to and from a data drive.

BACKGROUND OF THE INVENTION

Automated information storage and retrieval jukeboxes and systems (also known as libraries) are widely used to store large amounts of data on recordable media, such as magnetic tape or optical disk. Each piece of media is generally housed in a case or cartridge and stored in one of many cells in the library. When a host device requests that data be read from or recorded to a particular tape or disk, a library controller directs a robotic accessor to retrieve the desired cartridge from its storage cell and transport it to a drive unit inside the library. When the read or write operation is completed, the accessor removes the cartridge from the drive and returns it to a cell.

Several means have been developed to enable the accessor to retain a cartridge for transporting. One such means is a mechanical "hand" or gripper attached to the accessor to physically grasp and hold the desired cartridge. A gripper requires relatively complicated and space consuming mechanical elements which are prone to wear. The gripper also requires a sensor, such as a switch or a photodetector, and related control circuitry to detect the presence of the selected cartridge.

Another means, which reduces some of the problems associated with a mechanical gripper, is an electromagnetic picker. When the accessor is close to the selected cartridge, current is generated through an electromagnet creating a magnetic field to attract and hold a magnetically attractable label fixed to the cartridge. Like the mechanical gripper, the electromagnetic picker also requires a sensor to detect the presence of the selected cartridge. Moreover, to ensure that the cartridge is magnetically attached to the electromagnet and will remain there while being transported, a high current is required to generate the magnetic field. It will be appreciated that high current can cause heating and necessitate dissipation measures as well as increase the power requirements of the library accessor.

SUMMARY OF THE INVENTION

The present invention provides an electromagnetic accessor with an integrated sensor to detect the presence of a magnetically attractable label. Preferably, the accessor employs pulse width modulation to lower the power requirements and reduce the heat dissipation concerns present with prior art electromagnetic accessors. More specifically, the accessor of the present invention comprises an electromagnet mounted on a movable accessor, a driver for supplying a current to the electromagnet whereby a magnetic field is generated, means for comparing a measured reluctance of the magnetic field with a base reluctance to detect the presence of a magnetically attractable label, and means, interconnected with the driver and the comparing means, for initially directing the driver to supply a first pulsed signal, having a first amplitude and a first frequency, to the electromagnet, directing the driver to supply a second pulsed signal, having a second amplitude and a second frequency, to the electromagnet in response to the detection of the presence of the magnetically attractable label and subsequently directing the driver to supply a third pulsed signal, having a third amplitude and the first frequency, to the electromagnet.

The present invention is also adaptable for use in other environments in which a magnetically attractable item is to be detected and transported.

The foregoing and other features and advantages of the invention will be apparent from the following more particular description of preferred embodiments of the invention, as illustrated in the accompanying drawings.

DETAILED DESCRIPTION OF THE INVENTION

Figure 1:
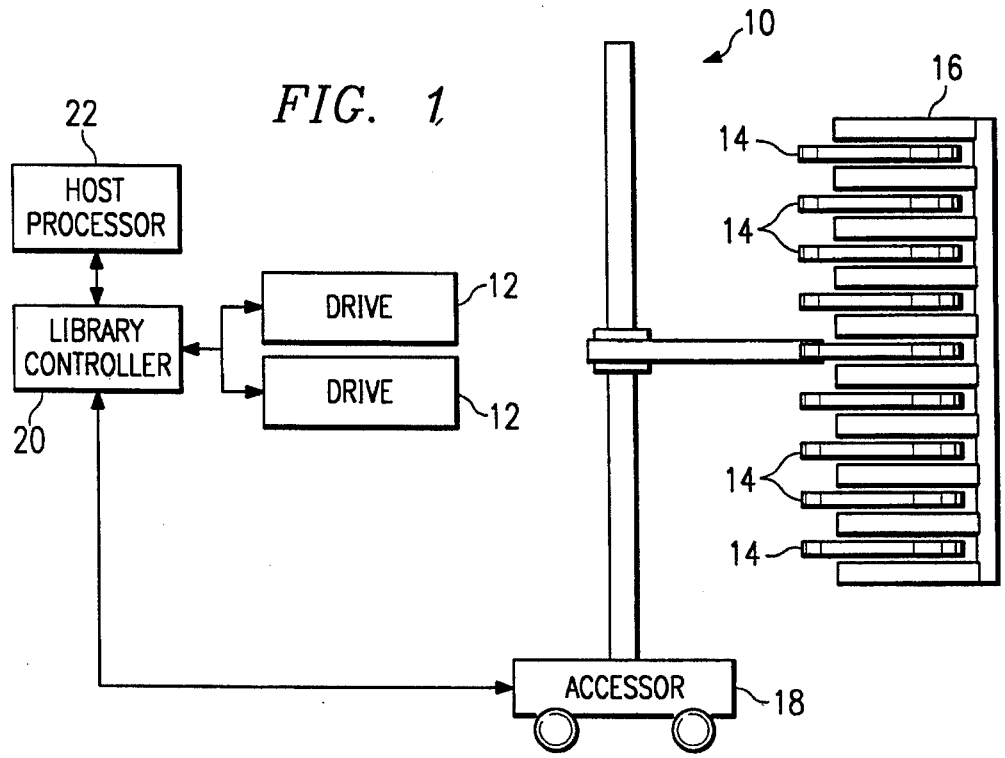
FIG. 1 is a block diagram of an automated storage and retrieval library of the present invention.

FIG. 1 is a block diagram of an automated storage and retrieval library 10 employing the sensing and holding device of the present invention. The library 10 includes one or more drives 12, a plurality of media cartridges 14 stored in an array of cells 16, and an accessor 18 for transporting a selected cartridge 14 between a storage cell 16 and a drive 12. The drives 12 can be optical disk drives or magnetic tape drives and the cartridges can contain optical or magnetic media, respectively. The library 10 also includes a library controller 20 interconnected to the drives 12 and the accessor 18. The controller 20 is further interconnected to a host processor 22 from which it receives access commands; information to be recorded on, or to be read from, selected cartridges 14 is transmitted between the drives 12 and the host 22 through the library controller 22.

Figure 2:
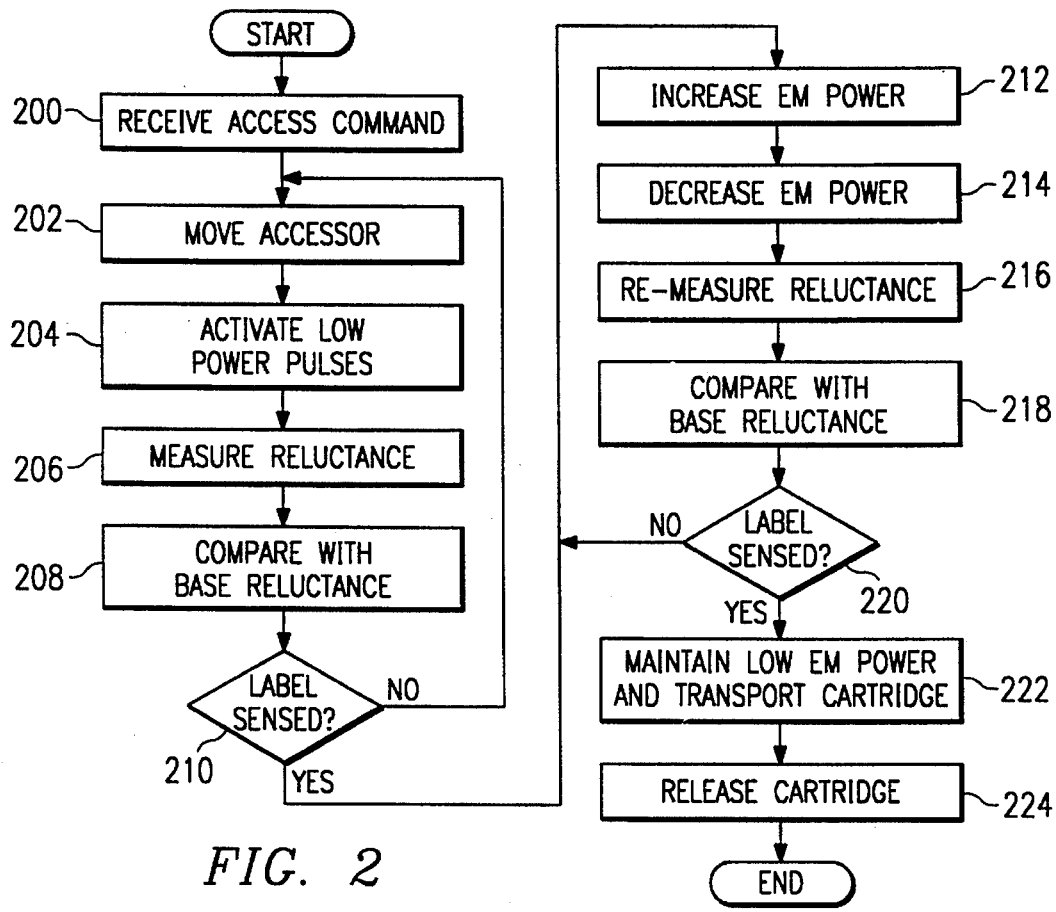
FIG. 2 is a flowchart of a method of the present invention.
Figure 3:
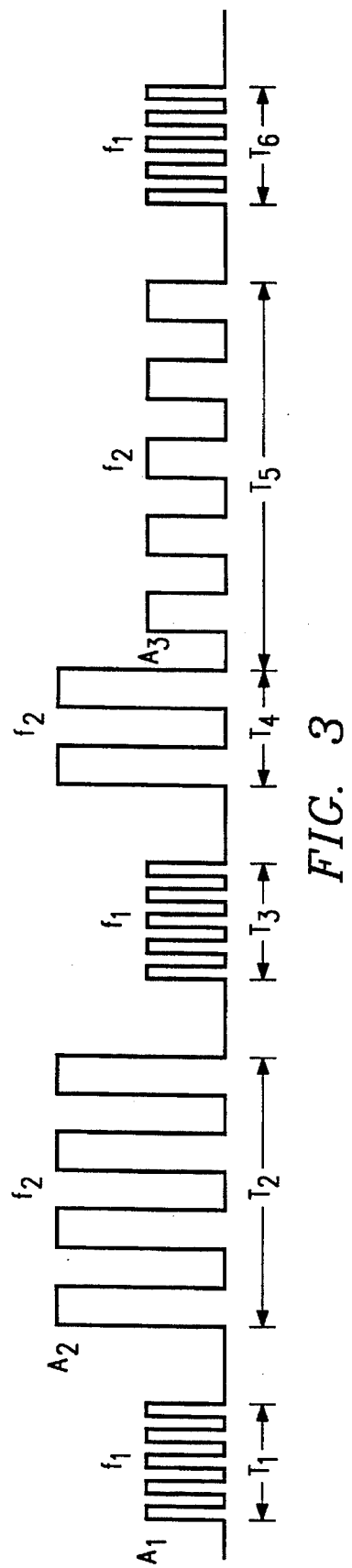
FIG. 3 is an exemplary timing diagram of various pulsed signals of the present invention.

Referring now to FIGS. 2 and 3, a method of the present invention will be described beginning upon receipt by the controller 20 of a command from the host 22 to access a cartridge for a data read or write operation (Step 200). If the operation requires that a cartridge be transported from a cell to a data drive, or from a drive to a cell, the library controller 20 directs the accessor 18 to move to the current cartridge location (Step 202). With the accessor positioned close to the expected location, an electromagnet is optionally modulated with low amplitude (A1), high frequency (f1) pulses for a time T1 (Step 204) measured reluctance (Step 206). The measured reluctance is compared with a base reluctance (Step 208), the value of which is predetermined and based upon such factors as the size of the label, the strength of the magnetic field, etc. If no label is present (or not sufficiently close to the electromagnet), the measured reluctance will be less than the base reluctance. Otherwise, the measured reluctance will be greater than the base reluctance. If no label is sensed (Step 210), the position of the electromagnet is moved (Step 202) and the process repeated until the label is sensed (Step 210). It will be appreciated that an error recovery procedure will be initiated if the label cannot be sensed after a predetermined number of attempts.

Once the label is sensed (Step 210), the electromagnet driver increases the amplitude (to A2) and decreases the frequency (to f2) of the pulses through the electromagnet for a time T2 (Step 212), thereby increasing the strength of the electromagnetic field and attracting the cartridge label. The electromagnet is then modulated at the initial values A1 and f1 during time T3 (Step 214) and the reluctance measured a second time (Step 216). Again, the measured reluctance is compared to the base reluctance (Step 218) and it is determined whether the label is still sensed (Step 220). If not, indicating that the cartridge is not held by the electromagnet, the electromagnet is again modulated at A2 and f2 (Step 212) and the process repeated. Again, it will be appreciated that an error recovery procedure will be initiated if the label cannot be sensed after a predetermined number of attempts.

After the cartridge is again sensed (Step 220), the electromagnet can optionally be modulated for a short time T4 at the second amplitude A2 and second frequency f2 to "lock" the cartridge against the electromagnet. After the cartridge is securely held by the electromagnet, the electromagnet is modulated at f2 but at a lower amplitude, A3, than the second amplitude, A2, and the cartridge transported to the target location during time T5 (Step 220) for storage in a cell or a read or write operation in a drive. When the cartridge has been delivered, modulation ceases to release the cartridge (Step 224); the accessor backs away and can attempt to sense the presence of the cartridge during a final time period T6. If no cartridge is sensed, the accessor is free for other operations; otherwise, the previous two steps are repeated until the cartridge is definitely released.

Selection of the frequencies f1 and f2 depends upon, among other factors, the design of the electromagnet and the magnetic path. Satisfactory performance has been obtained when f1 is within the range of about 50 Hz to about 250 Hz and f2 is within the range of about 10 Hz to about 50 Hz. Moreover, it is preferable that f1 be approximately five times greater than f2. Amplitudes A1, A2 and A3 can be approximately 18 V, 36 V and 18 V, respectively.

Figure 4:
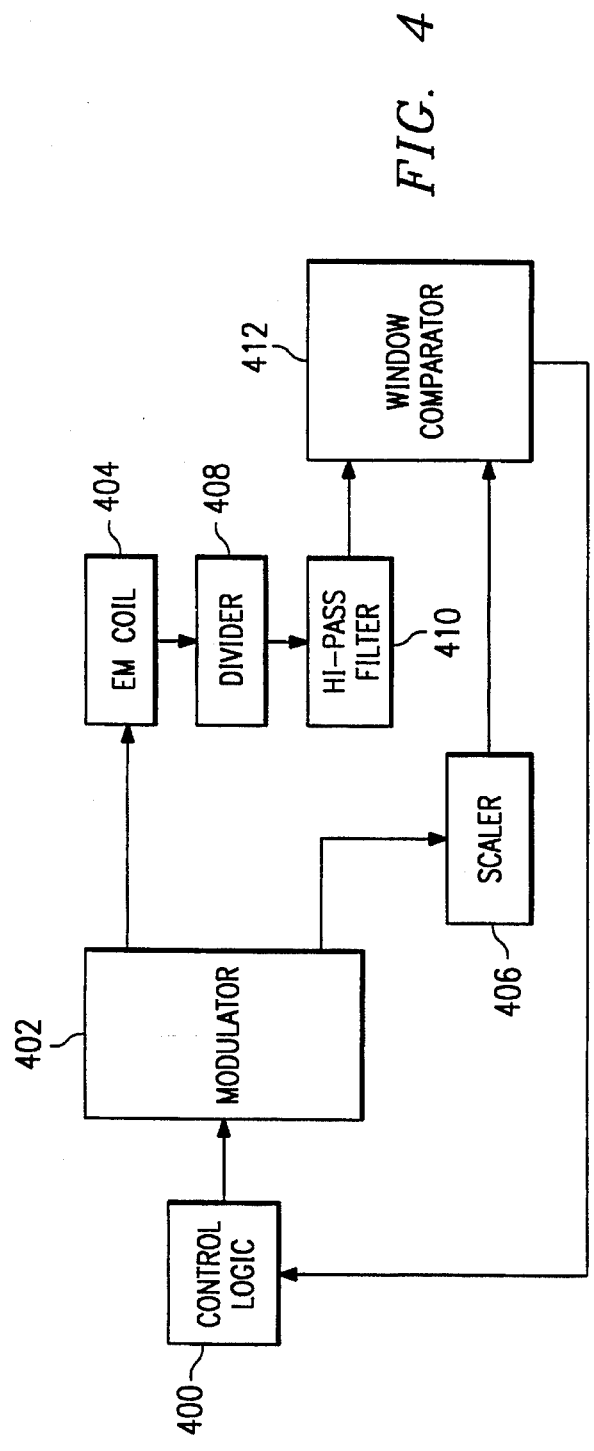
FIG. 4 is a block diagram of a sensing/modulating device of the present invention.

FIG. 4 is a block diagram of the modulating and sensing device of the present invention. It includes control logic 400, which can be part of the library controller 20, an electromagnet modulator 402, an electromagnet coil 404, a scaler 406, a divider 408, a high pass filter 410 and a window comparator 412. The control logic 400 outputs signals directing the modulator 402 to establish the desired amplitude and frequency of the pulses driving the coil 404. The amplitude of the voltage across the coil 404 is representative of the reluctance of the magnetic field generated by the coil 404. Consequently, when the device is in a sense mode, the reluctance of the magnetic field is measured by detecting the voltage across the coil 404, after being scaled down by the divider 408 (which can be, for example, a resistor of appropriate value between the coil 404 and ground). The scaled reluctance signal is filtered and received by the comparator 412. Simultaneously, a base signal, modulated at the same frequency as the signal to the coil 404, is generated by the modulator 402 and scaled by the scaler 406 by the same amount as the divider 408. The scaled base signal is sent to the comparator 412.

Because the two signals transmitted to the comparator 412 are each modulated and have maximum and minimum amplitudes, the comparator 412 transmits a cartridge present signal to the control logic 400 if the maximum or minimum amplitude of the reluctance signal is greater than or less than the maximum or minimum amplitude, respectively, of the base signal. The comparator 412 can comprise two comparators, one for comparing the maximum amplitudes and the other for comparing the minimum amplitudes.

While the invention has been particularly shown and described with reference to preferred embodiments thereof, it will be understood by those skilled in the art that various changes in form and details may be made therein without departing from the spirit and scope of the invention.

What is claimed is:

1. A method for transporting an information cartridge in an automated storage and retrieval library system, comprising the steps of:

receiving a command to transport a selected cartridge, having a magnetically attractable label, to a target location;

moving a library accessor to a first location adjacent the selected cartridge;

activating a magnetic field on the accessor to a first strength;

measuring the reluctance of the magnetic field;

making a first comparison of the measured reluctance with a base reluctance;

if said first comparison step indicates the presence of the magnetically attractable label of the selected cartridge, increasing the magnet field to a second strength;

decreasing the magnet field to a third strength;

remeasuring the reluctance of the magnetic field;

making a second comparison of the remeasured reluctance with the base reluctance; and if the second comparison step indicates the continued presence of the magnetically attractable label, maintaining the magnetic field at the third strength and transporting the selected cartridge to the target location.

2. The method of claim 1, further comprising the steps, if said first comparison step does not indicate the presence of the magnetically attractable label of the selected cartridge:

moving the accessor to a second location adjacent the magnetically attractable label;

measuring the reluctance of the magnetic field; and making a third comparison of the measured reluctance with the base reluctance.

3. The method of claim 1, further comprising the steps, if said second comparison step does not indicate the continued presence of the magnetically attractable label of the selected cartridge:

increasing the magnet field to the second strength;

decreasing the magnet field to the third strength;

remeasuring the reluctance of the magnetic field; and making a fourth comparison of the remeasured reluctance with the base reluctance.

4. The method of claim 1, wherein the strength of the magnetic field is controlled by pulse width modulation of drive current flowing through an electromagnet.

5. The method of claim 4, wherein:

said step of activating the magnetic field to the first strength comprises supplying current, having a first amplitude and frequency, to a magnetic coil;

said step of increasing the magnetic field to the second strength comprises supplying current, having a second amplitude and frequency, to the magnetic coil; and said step of decreasing the magnetic field to the third strength comprises supplying current, having a third amplitude and frequency, to the magnetic coil.

6. An automated storage and retrieval library system, comprising:

a plurality of cells for storing information cartridges having magnetically attractable labels;

a drive unit for reading information from a selected cartridge;

a accessor for transporting the selected cartridge between a storage cell and said drive unit;

a library controller interconnected with said drive unit, said accessor and a host device;

an electromagnet mounted on said accessor;

a driver for supplying a current to said electromagnet whereby a magnetic field is generated;

means for comparing a measured reluctance of the magnetic field with a base reluctance to detect the presence of a magnetically attractable label; and means, interconnected with said driver and said means for comparing, for initially directing said driver to supply a first current to said electromagnet, directing said driver to supply a second, greater current to said electromagnet in response to the detection of the presence of the magnetically attractable label, subsequently directing said driver to supply a third, lower current, to said electromagnet and, in response to the continued detection of the presence of the magnetically attractable label, directing said accessor to transport the selected cartridge.

7. The library system of claim 6, wherein said driver comprises a pulse width modulator.

8. The library system of claim 7, wherein:

the first current has a first amplitude and frequency;

the second current has a second amplitude and frequency; and the third current has a third amplitude and frequency.

9. An apparatus for accessing items having magnetically attractable labels, comprising:

an electromagnet mounted on a movable accessor;

a driver for supplying a current to said electromagnet whereby a magnetic field is generated;

means for comparing a measured reluctance of the magnetic field with a base reluctance to detect the presence of a magnetically attractable label; and means, interconnected with said driver and said means for comparing, for initially directing said driver to supply a first current to said electromagnet, directing said driver to supply a second, greater current to said electromagnet in response to the detection of the presence of the magnetically attractable label and subsequently directing said driver to supply a third, lower current to said electromagnet.

10. The apparatus of claim 9, wherein said driver comprises a pulse width modulator.

11. The apparatus of claim 10, wherein:

the first current has a first amplitude and frequency;

the second current has a second amplitude and frequency; and the third current has a third amplitude and frequency.

* * * * *